Sept. 19, 1939.  P. M. VAN DOORMAAL  2,173,459
PENETRATION INDEX SLIDE RULE
Filed Sept. 7, 1937

Inventor: Piet Marie Van Doormaal
By his Attorney H. Birch

Patented Sept. 19, 1939

2,173,459

UNITED STATES PATENT OFFICE 2,173,459

PENETRATION INDEX SLIDE RULE

Piet Marie van Doormaal, Berkeley, Calif., assignor to Shell Development Company, San Francisco, Calif., a corporation of Delaware Application September 7, 1937, Serial No. 162,634

2 Claims. (Cl. 235—70)

This invention relates to a slide rule, and particularly to a penetration index slide rule, for determining the penetration index of asphalts, asphaltic materials, tars, pitches, rosins, and natural and synthetic resins.

The object of the invention is to provide means whereby the penetration index of asphaltic material may be easily, quickly and accurately calculated, when its softening point and its penetration at a lower temperature are known.

The invention comprises essentially a penetration scale, a softening point scale, and a penetration index scale, mounted so that the penetration scale and the softening scale are movable with respect to one another, and the relative position between these two scales determines the reading on the penetration index scale. While the scales as disclosed herein are particularly intended for asphalts and the related materials enumerated above, the device may also be employed to calculate a penetration index of other materials which have a determinable softening point and whose penetration at a lower temperature may be determined.

It is well known that the temperature susceptibilities of asphalts may vary considerably according to the nature of the initial material they are derived from and to the method of producing them. Thus, asphalts generally utilized for road making are different from the blown asphalts used in the roofing industry, the latter are less susceptible to temperature changes than the former. By this is meant that the rate of change is viscosity for these roofing asphalts as the temperature rises is lower than the corresponding rate for road asphalts.

The wide temperature range over which viscosity determinations have to be made for the great variety of asphalt applications and the great divergence in hardness of the various grades makes it necessary to measure viscosities ranging from 1 to $10^{10}$ poises. In consequence of these widely divergent magnitudes, the viscosities have to be determined by different methods.

Two of such tests which are frequently made are the softening point and the penetration. When asphalts and similar materials are heated, softening does not take place at a definite temperature, but the consistency gradually and imperceptibly changes from exceedingly thick and slow flowing to softer and less viscous liquids. For this reason the determination of the softening point must be made by a fixed, arbitrary and closely defined method if the results obtained are to be comparable and reproducible. This point is often referred to as the "melting point."

While my invention may be applied to any method of determining the softening or melting point, the calculations given herein refer to the Ring-and-Ball softening point, determined according to the test method D–36–26 of the American Society for Testing Materials. Similar test methods, such as test method E–28–36 T may also be used. This temperature is, in the present specification, designated as "Softening point R&B" or $$"t_{R\&B}"$$

The penetration is the consistency of the material expressed as the distance that a standard needle vertically penetrates a sample of the material under specified conditions of loading, time and temperature. While the scales may be calculated for any desired test conditions, the calculations given herein are based on a load of 100 grams, applied for a time of five seconds at a temperature $t_p$ under conditions specified in test method D 5–25 of the American Society for Testing Materials. Any temperature may be employed, and the device described herein is provided with alternate scales whereby penetration determined either at 59°, 77° or 104° F. may be employed. Its value is herein designated as "Pen."; when followed by a subscript, the latter has reference to the temperature.

The penetration index, defined more particularly below, is an index of the susceptibility of the material to changes in consistency upon changes in temperatures, a high index indicating slight change in consistency or viscosity, and a lower index correspondingly greater changes.

The basis of the penetration index and of the scales employed is the rule that, if the temperature is not too high, the logarithm of the absolute viscosity $\eta$ usually is a linear function of the temperature, so that:

$$\log \eta = C_1 - C_2 t \qquad (1)$$

where $C_1$ is a constant, $C_2$ is characteristic of the temperature susceptibility, and $t$ is the temperature on any linear temperature scale. At the origin of the temperature scale, $\log \eta = C_1$.

The relationship between absolute viscosity and penetration for non-plastic bitumens, determined with a needle loaded with 100 grams for five seconds, is given by the equation:

$$\eta = \frac{5.13 \times 10^9}{\text{pen.}^{1.93}} \qquad (2)$$

Substituting this value in (1):

$$\log \text{pen.} = \frac{1}{1.93}(9.71 - C_1 + C_2 t) \quad (3)$$

It has been determined experimentally that at the Ring & Ball softening point, the viscosity corresponds to a penetration of about 800.

Since Equation 3 applies both for the temperature $$t_{R\&B}$$

(when the penetration is 800) and for $t_p$, at which a penetration test is carried out (when the penetration is $\text{pen.}_{t_p}$), by writing Equation 3 successively for each of these conditions and subtracting, the following equation may be derived:

$$\log 800 - \log \text{pen.}_{t_p} = \frac{C_2}{1.93}(t_{R\&B} - t_p) \quad (4)$$

or $$\log(\log 800 - \log \text{pen.}_{t_p}) - \log(t_{R\&B} - t_p) = \log C_2 - \log 1.93 \quad (5)$$

From an inspection of various grades of asphalts, it was found that they could be conveniently classified by the use of a penetration index, (P. I.) which was arbitrarily defined as follows for the centigrade temperature scale:

$$\frac{C_2}{1.93} = \frac{20 - P.I.}{50(10 + P.I.)} \quad (6)$$

Substituting in (5):

$$\log(\log 800 - \log \text{pen.}_{t_p}) - \log(t_{R\&B} - t_p) =$$

$$-\log 50 + \log\left(\frac{20 - P.I.}{10 + P.I.}\right)$$

which may be reduced to the form:

$$\log(2.903 - \log \text{pen.}_{t_p}) - \log(t_{R\&B} - t_p) =$$

$$\log\left(\frac{20 - P.I.}{10 + P.I.}\right) - 1.699 \quad (7)$$

When the Fahrenheit temperature scale is employed, the value $$\log(t_{R\&B} - t_p)$$

is greater, and the formula must be corrected by subtracting $$\log\left(\frac{9}{5}\right)$$

or 0.255 from the second term, so that the equation becomes:

$$\log(2.903 - \log \text{pen.}_{t_p}) - \log(t_{R\&B} - t_p) =$$

$$\log\left(\frac{20 - P.I.}{10 + P.I.}\right) - 1.954 \quad (7a)$$

On this basis, it was found that asphalts can be grouped into three classes merging into one another, the boundaries of which have been chosen more or less arbitrarily:

1. The class with an index between $-1$ and $+1$, the "N type". This class comprises most steam-refined bitumens (such as the Mexican), generally used for road making; these are sometimes called "normal bitumens".

2. The class with an index below $-1$, the "Z type". This class is also sometimes indicated by the name coal tar pitch type. Like the coal tar pitches, the bitumens of this type are characterized by their great susceptibility and, in general, also by their great brittleness.

3. The class with an index above $+1$, the "R type". In addition to a low temperature susceptibility, these bitumens are generally characterized by slight brittleness. As the majority of the blown bitumens have these characteristics, this type of bitumen is also sometimes indicated as the blown type.

The invention is illustrated more or less diagrammatically in the accompanying drawing, wherein—

Like parts are indicated by like characters throughout the specification and drawing.

Figure 1:
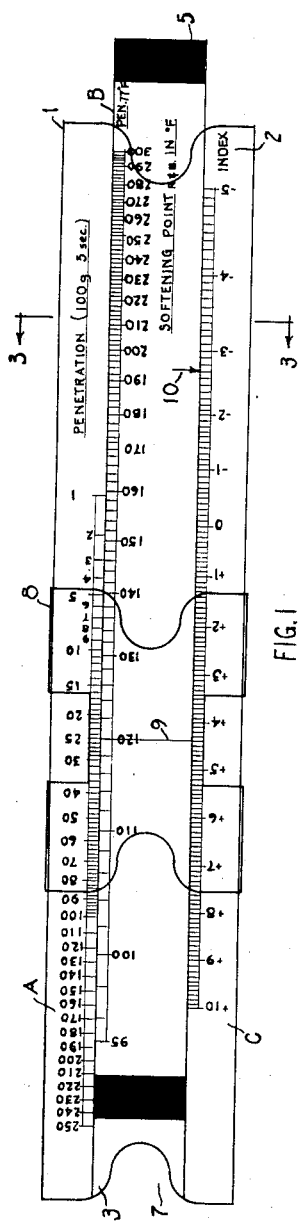
Figure 1 is a plan view of the obverse of the slide rule and scales.

The slide rule comprises a pair of fixed parallel bars 1 and 2, attached to a rigid support or body 3 by means of fasteners 4. A slide bar 5 is mounted between the fixed bars, so as to slide longitudinally between them. It is retained by means of a transparent retaining cover 6, coextensive in length with the support 3 and having its edges hooked about the lateral edges of the support. The support 3 and the cover 6 are notched at the ends at 7 to permit the slide bar 5 to be grasped. A sliding clip 8, made of transparent material, and carrying a hairline 9 is slidably mounted over the cover 6.

The scales on the fixed bars 1 and 2 are designated A and C, respectively, and the scale on the front of the slide 5 is designated B, as shown in Figure 1.

The penetration scale A is calibrated by the equation $$x = \log(2.903 - \log \text{pen.}) \quad (8)$$

where $x$ is the abscissa of any graduation, i. e., the distance from the point of origin measured along an equidivision standard scale, values of $x$ increasing from left to right. The origin is at the graduation pen.=80. (It may be explained that the equidivision standard scale does not appear on the rule and is not shown in the drawing, being used only for determining the proper positions for the graduations on the various scales of the rule.) In the case of the linear rule illustrated, the abscissae $x$ are measured linearly along the axis of the scale; in the case of a circular rule, the abscissae and the standard scale are in angular units. It should be noted that the term "abscissa" in the present specification and claims is intended to designate the value $x$, whether measured in linear or angular units. As shown, the highest penetration on the scale is 250, corresponding to a value of $x=-0.297$ at the left end of the scale.

The softening point or melting point scale must be constructed for a particular value of $t_p$, and several of such scales are provided. This scale is calibrated by the equation $$x_1 = \log(t_{R\&B} - t_p), \quad (9)$$

where $x_1$ again is the abscissa, increasing from left to right, on a scale equicrescent with the standard scale. On the obverse side of the slide 5, as shown in the drawing, the scale B is graduated for the temperature $t_p = 77°$ F., and softening points are indicated in degrees Fahrenheit. The graduations are, therefore, according to the equation:

$$x_1 = \log(t_{R\&B} - 77) \quad (9a)$$

As shown in the drawing, the lowest softening point on the scale is 95° F., corresponding to a value of $x=1.255$ at the left end of the scale, the origin being off the scale.

The penetration index scale C, like the scale A, may be the same for any temperature $t_P$, and irrespective of whether the centigrade or Fahrenheit scale is used. It is calibrated by the equation $$x_2 = \log\left(\frac{20 - P.I.}{10 + P.I.}\right) \quad (10)$$

where $x_2$ again is the abscissa, increasing from left to right, on a scale equicrescent with the standard scale, with the origin at P. I.$=+5$.

An index mark, in the form of an arrow 10 on the slide 5, is located thereon to indicate the penetration index on the C scale corresponding to any position of the slide 5. For the Fahrenheit scale, it is located so that when the slide 5 is adjusted to cause the difference between the abscissa of a point on the A scale and the abscissa of the point on the B scale coincident therewith to be $-1.954$, the arrow points to $+5$, in accordance with Equation 7a. Thus when the temperature 200° F. on the softening point scale B (corresponding to $x=2.090$) is set opposite the penetration 34.3 on the penetration scale A (corresponding to $x=0.136$) the difference is $0.136 - 2.090$, or $-1.954$, and the arrow should indicate the value $+5$ on the C scale.

Figure 4:
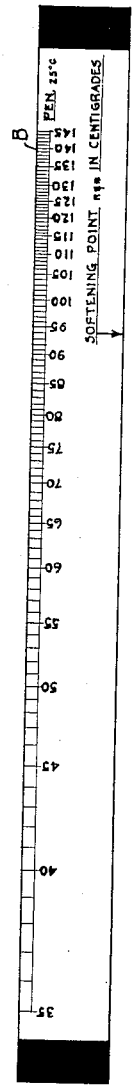
Figure 4 is a plan view of the obverse of a modified slide, adapted for the centigrade temperature scale.

Of course, for a centigrade scale, the Equation 7 would apply, and the arrow should point to the reading $+5$ on the C scale when the slide 5 is adjusted to cause the difference between the values of $x$ on coincident points on the A and B scales to be $-1.699$. Figure 4 shows a B scale graduated for the centigrade scale, for use with penetrations determined at 25° C. It may be used with the same A and C scales as the Fahrenheit B scale described above.

Figure 2:
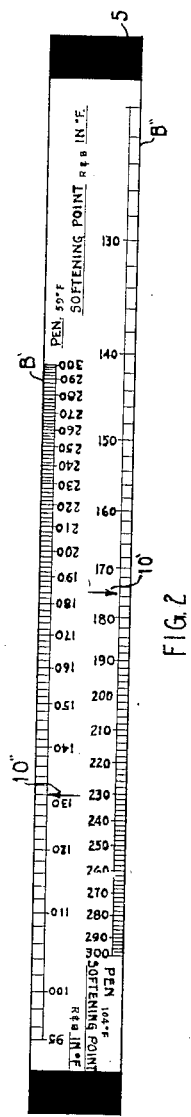
Figure 2 is a plan view of the reverse of the slide.
Figure 3:
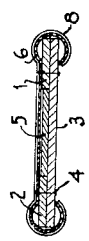
Figure 3 is a sectional view taken on line 3—3 of Figure 1.

Additional B scales are provided on the reverse of the slide 5; these may be graduated either for the centigrade temperature scale, or for the same temperature scale as the obverse, but for different values of $t_P$. As shown in Figure 2 of the drawing, the slide 5 is provided with a scale B′ and an arrow 10′ for $t_P=59°$ F.; and with a scale B″ and an arrow 10″ for $t_P=104°$ F. When the penetrations are determined at 59° F., the slide 5 is removed from the rule, reversed and re-inserted so as to cause the scale B′ adjacent to the scale A, and the arrow 10′ to point toward the scale C. When the penetrations are determined at 104° F., the slide 5 is inverted, bringing the scale B″ contiguous to the scale A, and causing the arrow 10″ to point to the scale C.

The scales B′ and B″ are calibrated according to the principles explained above for the scale B, i. e., the scale B′ is calibrated by the equation $$x_1 = \log(t_{R\&B} - 59) \quad (9')$$

and the scale B″ by the equation $$x_1 = \log(t_{R\&B} - 104) \quad (9'')$$

The arrow 10″ is located to point to the origin on the C scale (marked $\pm 5$) when the difference between coincident values of $x$ and $x_1$ on the A and B′ scales is $-1.954$; and the arrow 10″ is likewise located so as to point to the origin on the C scale when the difference between coincident values of $x$ and $x_1$ on the A and B″ scales is $-1.954$.

While I have illustrated a linear slide rule, it should be understood that my invention is not limited to the particular embodiment shown, but may be embodied as well in a circular rule, or in a drum type rule, as is well known in the art.

The operation of the rule is as follows: The slide 5 is inserted between the fixed bars 1 and 2 to cause the B scale corresponding to the temperature at which the penetrations are determined to be adjacent to the A scale. The penetration and softening points of the asphalt having been determined, the hairline 9 on the clip 8 is set to the penetration on the A scale. The slide 5 is then adjusted to bring the graduation indicating the softening point on the B scale under the hairline. The penetration index is read on the C scale opposite the arrow.

*Example I.*—To find the penetration index of an asphalt having a penetration of 25, measured at 77° F., and a Ring and Ball softening point of 120° F., the hairline is set to 25 on the A scale; the slide 5 is adjusted to cause the graduation 120 to appear beneath the hairline; the penetration index, read on the C scale opposite the arrow, is found to be $-2.77$. This setting is illustrated in Figure 1 of the drawing.

The rule can also be employed to determine the penetration to be expected at a new temperature when the penetration at a first temperature and the softening point of the asphalt or similar material are known. For this purpose it is necessary that the rule carrying a softening point scale graduated for the first temperature and a separate softening point scale for the new temperature. In the first operation the slide 5 is inserted into the rule so that the proper softening point scale B which is graduated for the first temperature, at which the penetration is known, is in cooperative relation with the A scale, and the penetration index for the asphalt is determined as described above. In the second operation the slide 5 is positioned so that the particular softening point scale B which is graduated for the new temperature is in cooperative relationship with the scale A (this operation necessitating the withdrawal and inversion or reversal of the slide in the embodiment illustrated) and set to indicate the previously determined value of the penetration index on the C scale. The penetration at the new temperature may then be read on the A scale opposite the softening point on the B scale.

The above procedure is also applicable when the penetration index (instead of the softening point) and the penetration at a first temperature are known, the softening point being in this case determined in the first operation.

*Example II.*—To find the penetration at 59° F. (15° C.) of the asphalt described in Example I, the slide 5 is inserted as shown in Figure 1 to determine the penetration index ($-2.77$). The slide 5 is then reversed so as to bring the scale B′ (see Figure 2), which is graduated for 59° F., next to the A scale and positioned to cause the index 10′ to indicate $-2.77$ on the C scale. The penetration expected at 59° F., read on the A scale opposite 120° F. (the softening point of the asphalt) on the B scale, is found to be 5.86.

I claim as my invention:

1. A computing device of the type described, comprising a scale graduated in accordance with a given formula, index means adapted to cooperate with indicia on a scale means different from said scale, one of said means being fixed with respect to the first mentioned scale and the other means being movable relatively thereto, a group of different scales graduated in accordance with a different formula, each scale of said group of scales corresponding to a selected value of a constant in said different formula, each scale of said group of scales being correlated with the means which is relatively movable with respect to the first mentioned scale and occupying a position relatively to said means with which it is correlated which is different for each scale of said group of scales.

2. A computing device of the type described, comprising a scale graduated in accordance with a given formula, a plurality of index marks movable with respect to said scale and adapted to cooperate with indicia on a scale different from said scale and fixed relatively thereto, a group of different scales graduated in accordance with a different formula, each scale of said group of scales corresponding to a selected value of a constant in said different formula, each scale of said group of scales being correlated with one of said index marks and occupying a position relatively to the index mark with which it is correlated which is different for each scale in said group of scales.

PIET MARIE van DOORMAAL.